United States Patent
Pannicke

(10) Patent No.: US 11,972,677 B2
(45) Date of Patent: Apr. 30, 2024

(54) GOODS STOCKING SYSTEM

(71) Applicant: CHEP Technology Pty Limited, Sydney (AU)

(72) Inventor: Marco Pannicke, Cologne (DE)

(73) Assignee: CHEP Technology Pty Limited, Sydney (AU)

(*) Notice: Subject to any disclaimer, the term of this patent is extended or adjusted under 35 U.S.C. 154(b) by 284 days.

(21) Appl. No.: 17/297,037

(22) PCT Filed: Nov. 26, 2019

(86) PCT No.: PCT/EP2019/082535
§ 371 (c)(1),
(2) Date: May 26, 2021

(87) PCT Pub. No.: WO2020/109286
PCT Pub. Date: Jun. 4, 2020

(65) Prior Publication Data
US 2022/0044530 A1 Feb. 10, 2022

(30) Foreign Application Priority Data
Nov. 27, 2018 (DE) ...................... 10 2018 129 886.2

(51) Int. Cl.
*G08B 5/22* (2006.01)
*G06Q 10/087* (2023.01)

(52) U.S. Cl.
CPC ............ *G08B 5/22* (2013.01); *G06Q 10/087* (2013.01)

(58) Field of Classification Search
CPC ................................ G08B 5/22; G06Q 10/087
See application file for complete search history.

(56) References Cited

U.S. PATENT DOCUMENTS

| | | | | |
|---|---|---|---|---|
| 4,962,466 A | * | 10/1990 | Revesz | G06Q 30/02 398/166 |
| 5,671,362 A | * | 9/1997 | Cowe | G07F 7/00 340/568.1 |
| 5,704,049 A | * | 12/1997 | Briechle | G06Q 30/02 705/28 |

(Continued)

FOREIGN PATENT DOCUMENTS

| | | |
|---|---|---|
| CN | 1947142 A | 4/2007 |
| CN | 203693111 U | 7/2014 |

(Continued)

OTHER PUBLICATIONS

International Search Report and Written Opinion for International Application No. PCT/EP2019/082535, dated Jan. 16, 2020, (10 pages), European Patent Office, Rujswijk, Netherlands.

(Continued)

*Primary Examiner* — Curtis J King
(74) *Attorney, Agent, or Firm* — Alston & Bird LLP

(57) ABSTRACT

The invention relates to a goods stocking system comprising a goods shelving unit (10), in which at least one goods storage compartment (12) is provided, a sheet-like sensor element (16), which is removably arranged on the bottom (14) of the goods storage compartment (12), an energy supply (54, 56) for the sensor element (16), a controller (52), which can evaluate a signal of the sensor element (16), and a data link (50) between the sensor element (16) and the controller (52).

20 Claims, 3 Drawing Sheets

(56) References Cited

U.S. PATENT DOCUMENTS

| | | | |
|---|---|---|---|
| 5,963,920 A * | 10/1999 | Rose | G06Q 10/087 705/28 |
| 7,808,367 B2 * | 10/2010 | Moore | G06K 17/00 340/10.2 |
| 8,833,654 B1 * | 9/2014 | Grant | G06Q 10/087 235/383 |
| 9,911,290 B1 | 3/2018 | Zalewski | |
| 9,941,573 B2 * | 4/2018 | Fukuda | H01Q 13/206 |
| 10,130,196 B2 * | 11/2018 | Burns | A47F 1/12 |
| 10,360,533 B2 * | 7/2019 | Atchley | G06K 19/0723 |
| 10,528,777 B2 * | 1/2020 | Shi | G06F 3/046 |
| 10,552,791 B2 * | 2/2020 | Brooks | G06Q 10/087 |
| 10,724,895 B1 * | 7/2020 | McNamara | G06T 5/002 |
| 11,308,443 B2 * | 4/2022 | Deng | A47F 10/02 |
| 11,503,926 B2 * | 11/2022 | Zhai | A47F 5/0006 |
| 11,514,766 B1 * | 11/2022 | McDaniel | G08B 13/2485 |
| 2005/0093690 A1 * | 5/2005 | Miglionico | G08B 13/2462 340/572.1 |
| 2005/0093701 A1 | 5/2005 | Hollon | |
| 2005/0168345 A1 | 8/2005 | Swafford, Jr. et al. | |
| 2005/0190072 A1 * | 9/2005 | Brown | G06Q 10/087 340/6.1 |
| 2006/0071774 A1 * | 4/2006 | Brown | G07F 9/026 340/522 |
| 2009/0153328 A1 * | 6/2009 | Otani | G06Q 30/06 705/28 |
| 2010/0169189 A1 * | 7/2010 | Allison | A47F 5/0823 211/49.1 |
| 2010/0169190 A1 * | 7/2010 | Allison | G06Q 10/087 705/28 |
| 2011/0259953 A1 | 10/2011 | Baarman | |
| 2012/0310570 A1 | 12/2012 | Pyne et al. | |
| 2013/0048724 A1 * | 2/2013 | Burnside | G06K 19/0723 235/492 |
| 2014/0201042 A1 * | 7/2014 | Meyer | G06Q 10/087 705/28 |
| 2015/0235157 A1 * | 8/2015 | Avegliano | G06Q 10/087 705/7.25 |
| 2015/0269516 A1 * | 9/2015 | Fukuda | G06Q 30/06 705/28 |
| 2016/0026032 A1 * | 1/2016 | Moore | G06F 3/147 349/1 |
| 2016/0048798 A1 * | 2/2016 | Meyer | G01G 19/42 705/28 |
| 2016/0086005 A1 * | 3/2016 | Hattori | G06Q 30/00 340/10.51 |
| 2017/0108370 A1 * | 4/2017 | Pyne | G06Q 10/087 |
| 2017/0323162 A1 * | 11/2017 | Jones | H04N 7/183 |
| 2018/0025310 A1 * | 1/2018 | Gabbai | G06Q 10/04 705/28 |
| 2018/0082246 A1 * | 3/2018 | Jones | G06Q 10/087 |
| 2018/0276596 A1 * | 9/2018 | Murthy | G06V 20/52 |
| 2020/0234227 A1 * | 7/2020 | Gadou | G06Q 10/087 |
| 2021/0030169 A1 * | 2/2021 | Zhai | A47F 5/0823 |
| 2022/0104636 A1 * | 4/2022 | Chila | G16H 40/20 |

FOREIGN PATENT DOCUMENTS

| | | |
|---|---|---|
| CN | 107105905 A | 8/2017 |
| CN | 108652332 A | 10/2018 |
| JP | S59-180439 | 10/1984 |
| JP | 2014-152018 A | 8/2014 |
| JP | 2016-009329 A | 1/2016 |
| JP | 2016-511392 A | 4/2016 |

OTHER PUBLICATIONS

Office Action for Japanese Application No. 2021-529419, dated Oct. 3, 2023, 4 pages.

\* cited by examiner

GOODS STOCKING SYSTEM

The invention relates to a goods stocking system, as can be used in particular in supermarkets.

In supermarkets, there are self-service shelves for various goods, from which customers can help themselves. One example are shelving units in the bakery department, from the compartments of which customers can take the desired number of bread rolls.

However, considerable human resources are required in order to regularly check these goods shelving units to see whether sufficient baked goods are still available in all the compartments.

The object of the invention is to provide a goods stocking system in which the monitoring work by staff is reduced.

To achieve this object, according to the invention a goods stocking system is provided, comprising a goods shelving unit, in which at least one goods storage compartment is provided, a sheet-like sensor element, which is removably arranged on the bottom of the goods storage compartment, an energy supply for the sensor element, a controller, which can evaluate a signal of the sensor element, and a data link between the sensor element and the controller. The invention is based on the basic idea of using the sensor element to detect the stock levels of goods in the relevant goods storage compartment in an automated manner, such that the supermarket staff no longer have to regularly check the goods storage compartments.

Preferably, the sensor element has at least two electrodes, which form a capacitive sensor. In other words, the sensor element is scales that can detect the weight of the goods present in the goods storage compartment. Such capacitively operating scales have a level of accuracy with which weight differences down to less than 100 g can be detected. Even in the case of lightweight goods (such as bread rolls), the filling level of the goods storage compartment can be very precisely determined with comparatively little effort.

According to a configuration of the invention, the energy supply is formed by a battery. Since the controller need not be continually supplied with a signal regarding the goods stock levels, but instead it is sufficient to transmit said signal at certain intervals, a sufficiently long life can be achieved.

Alternatively, the energy supply can also have electrical contacts on the sensor element, which are connected to electrical contacts on the goods storage compartment in an electrically conductive manner. In this way, a sufficient amount of electrical energy can be provided to the sensor element over the long term, such that there is no need at all to ensure that energy consumption is as low as possible during signal detection and transmission.

In the process, the electrical contacts are preferably arranged such that the electrical connection is automatically established when the sensor element is arranged on the bottom of the goods storage compartment.

According to an alternative configuration, the energy supply has a coil assigned to the sensor element and a coil assigned to the goods storage compartment, the two coils being inductively coupled together. In this configuration, when placing the sensor element into the goods storage compartment there is no need to ensure that electrical contacts engage with one another since the coils are automatically inductively coupled together when they are arranged close to one another. Slight positioning tolerances of the sensor element within the goods storage compartment thus do not significantly impair the energy transmission.

The controller preferably has a signal output by means of which a request signal for goods can be sent. This request signal can, for example, be forwarded directly to the supermarket staff so that the relevant goods storage compartment is restocked.

The signal output can also be connected to a display device, such that the goods storage compartment that needs restocking is displayed on a display, for example.

It is also possible for the signal output to be connected to an inventory management system, such that certain goods can be reordered in an automated manner as soon as supplies drop below a particular level.

It is also possible for the signal output to be connected to a goods processing device, for example an oven, such that more of the relevant goods are produced once supply levels drop below a particular volume.

According to a preferred embodiment of the invention, the sensor element includes a transmitter, by which data can be wirelessly transmitted to the controller. In particular, the transmitter can transmit over a wireless data link that is distinguished on account of low energy consumption, for example a GSM link, such as a 2G link and/or an NB-IoT link (Narrowband Internet of Things). It is also possible for the transmitter to transmit using the WLAN standard.

The invention will be described below on the basis of an embodiment shown in the accompanying drawings, in which:

FIG. 1 shows a goods stocking system, which has a goods shelving unit 10 in which a plurality of goods storage compartments 12 are provided.

Figure 1:
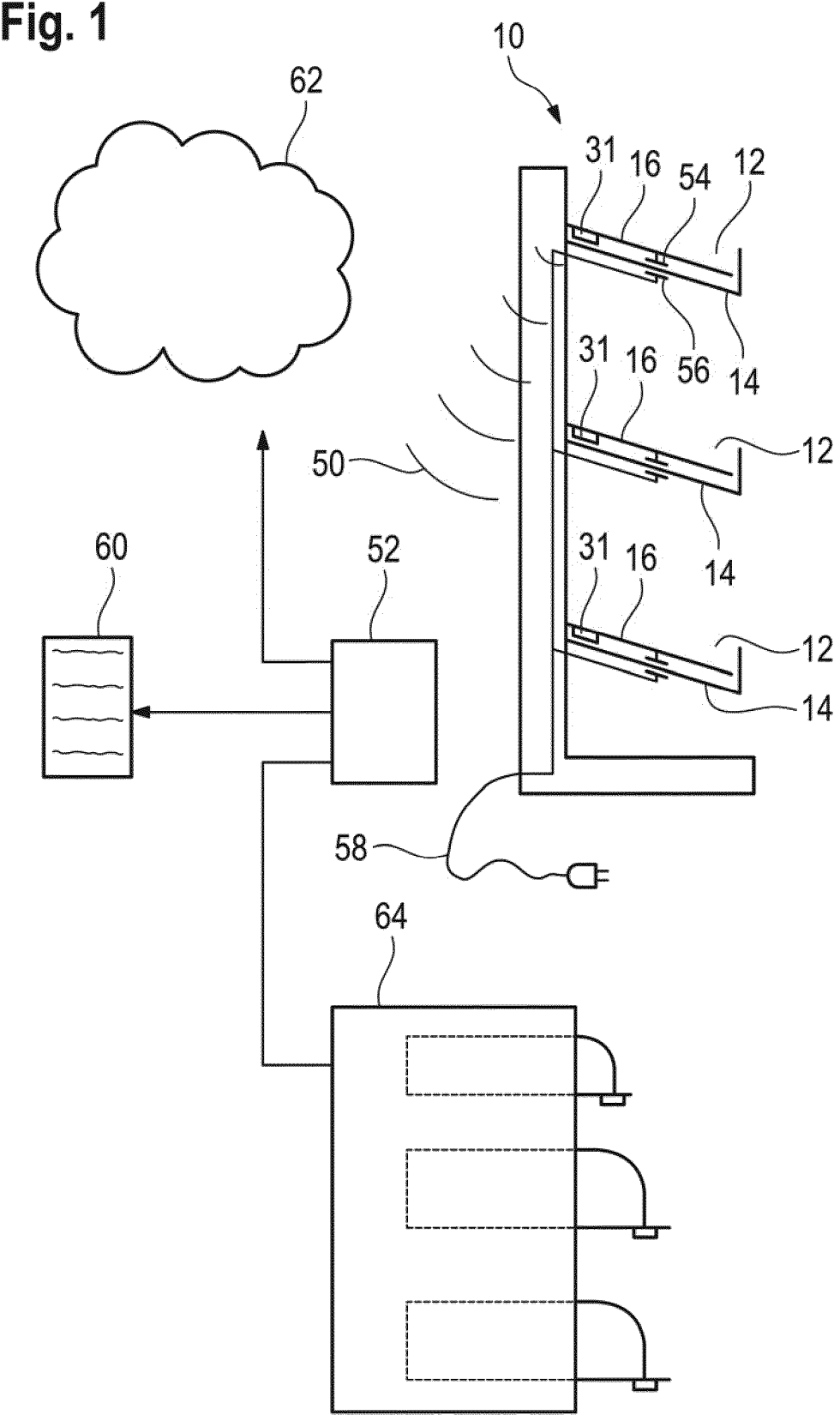
FIG. 1 is a schematic view of a goods stocking system according to the invention.

In this case, the goods storage compartments 12 are provided with a bottom 14 that descends diagonally towards a removal side (on the right-hand side in FIG. 1), such that the goods located in the goods storage compartment 12 automatically slide "forwards", allowing a customer to remove them easily.

A sheet-like sensor element 16 is arranged on the bottom 14 of each goods storage compartment 12 and extends substantially over the entire surface of the bottom 14.

The sensor element 16 is an inherently stable plate configured as a weighing cell. Therefore, the sensor element 16 can be used to detect whether and, where applicable, how many goods are located thereon and thus in the goods storage compartment 12.

Figure 2:
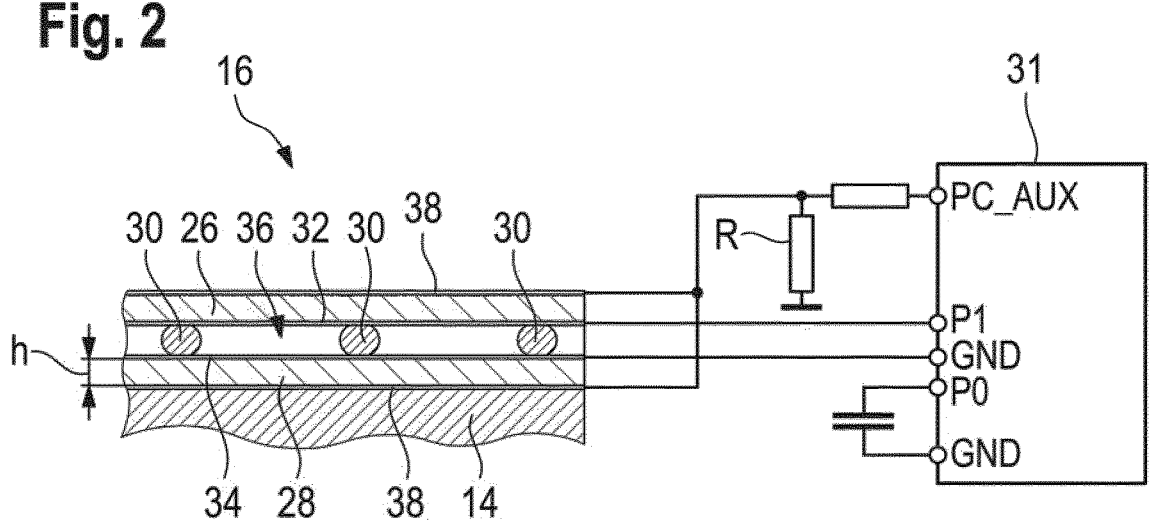
FIG. 2 is a schematic section through a sensor element that can be used in the goods stocking system from FIG. 1.

The construction of an example sensor element of this kind will be explained on the basis of FIGS. 2 and 3.

The sensor element 16 has a first main body 26 and a second main body 28, which consist of plastics material. A suitable wall thickness is in the range from 1 to 2 mm.

A body 30 made of resiliently flexible material is arranged between the two main bodies 26, 28. An evaluation circuit 31 is also provided.

On their "inside", i.e. on the faces facing one another, each of the main bodies 26, 28 is provided with electrically conductive surfaces 32 and 34, respectively, which form electrodes. By way of example, these can be configured as a copper coating.

The electrodes 32, 34 can extend over the entire surface of the main bodies 26, 28, or also be provided only in certain portions.

The evaluation circuit 31 is able to evaluate the capacitance of the capacitor formed by the electrodes 32, 34. The capacitance is dependent in particular on the distance h between the two electrodes 32, 34, the gap 36 between these two electrodes being filled on the one hand with the resiliently flexible material 30 and on the other hand with air, unless the resiliently flexible material 30 is provided in sheet-like form.

Figure 3:
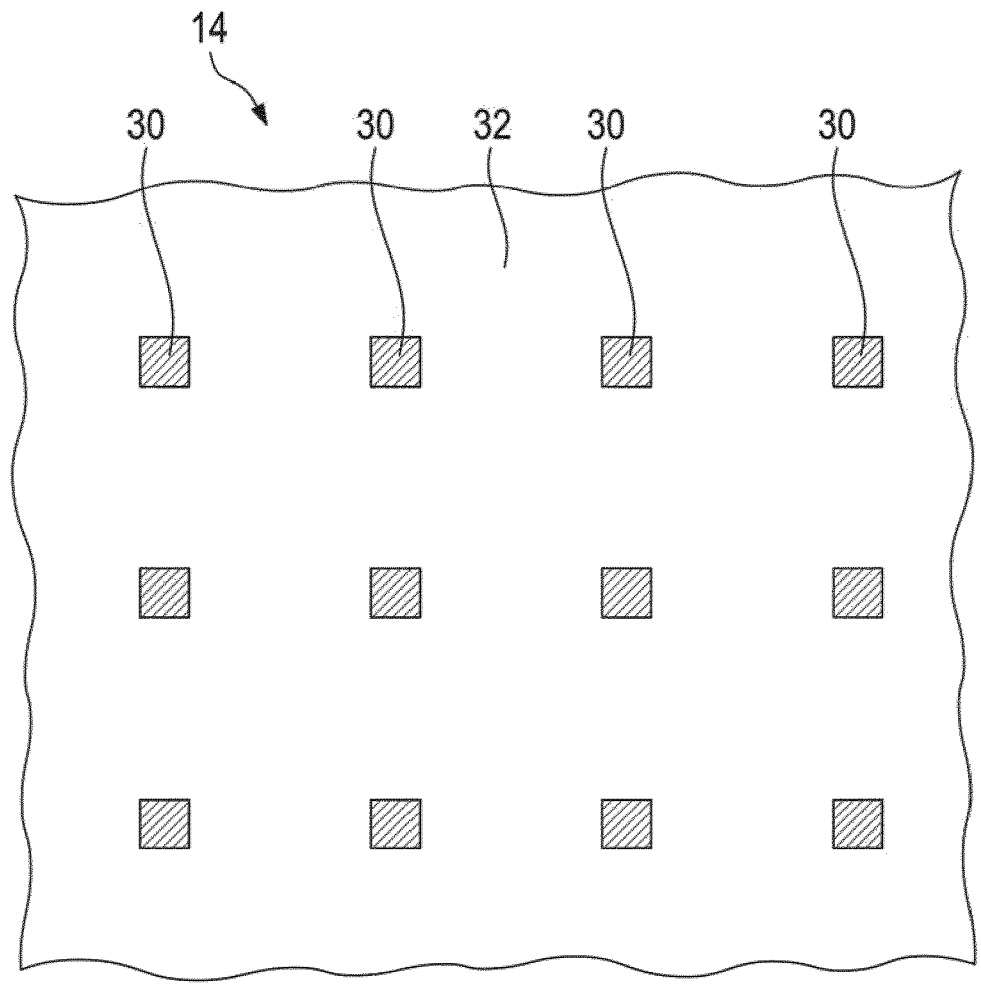
FIG. 3 is a plan view of a detail of a bottom part of the sensor device from FIG. 2.

As can be seen in FIG. 3, the resiliently flexible material 30 can be provided as a plurality of portions separated from one another.

An electrically conductive screening layer 38 can be provided on the outer faces, facing away from one another, of the main bodies 26, 28.

When goods are located on the top main body 26, the resilient material 30 is slightly deformed such that the distance between the electrodes 32, 34 is reduced slightly. The resultant change in the capacitance of the capacitor formed between the electrodes 32, 34 can be suitably evaluated by the evaluation circuit 31.

Figure 4:
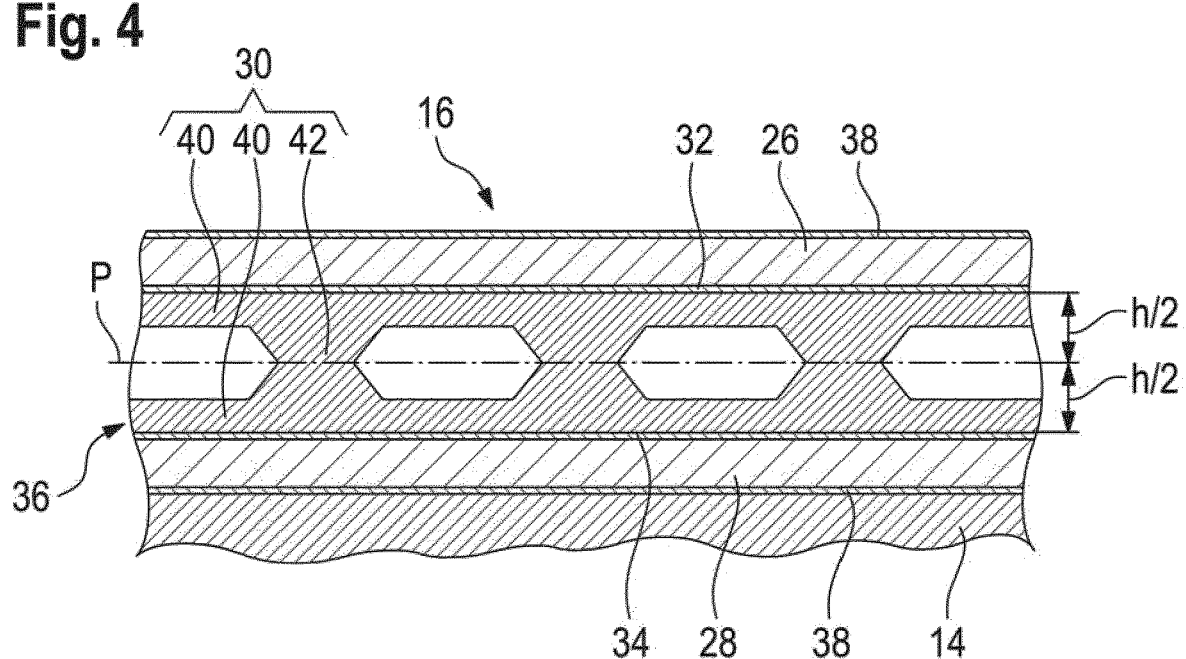
FIG. 4 is a cross section through a sensor element according to a second embodiment.
Figure 5:
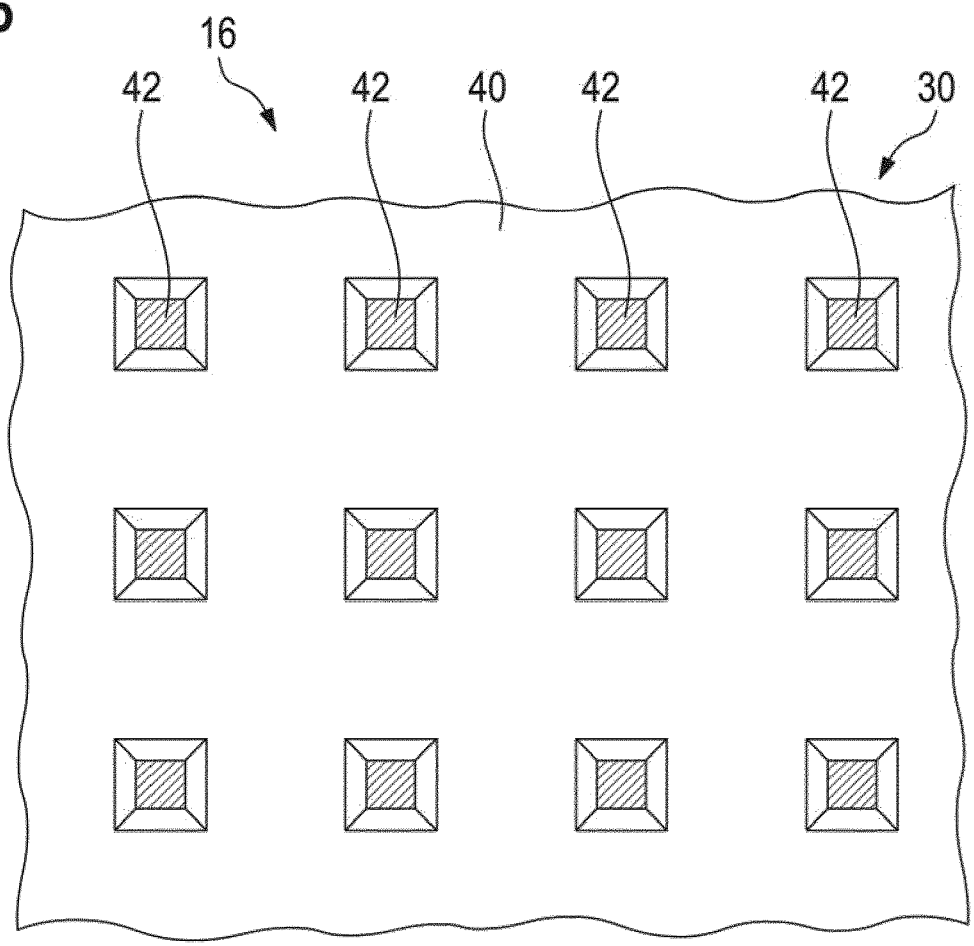
FIG. 5 is a plan view of a detail of the bottom part of the sensor element from FIG. 4.

FIGS. 4 and 5 show a second variant of the sensor element. For the components known from FIGS. 2 and 3, the same reference numerals are used and reference is made in this respect to the above explanations.

The difference between the first and second variant is that the resiliently deformable material 30 in the second variant consists of a plurality of sheet-like parts 40 provided with a plurality of pyramid-like protrusions 42. These protrusions abut one another in order to keep the electrodes 32, 34 at a distance from one another.

Regardless of the specific configuration of the resilient material 30, the evaluation circuit 31 is integrated in the sensor element 16 such that an autonomous weighing cell is formed.

This weighing cell can also include a temperature sensor in order to compensate for temperature-related changes to the properties of the sensor element 16.

An energy supply is provided for each of the sensor elements 16 in order to supply them adequately with electrical energy so that the desired signal can be generated.

The energy supply can be implemented as a battery that is integrated in each sensor element 16 in order to provide the necessary electrical energy for a particular operating period.

The energy can also be supplied externally. In the example embodiment shown in FIG. 1, the energy supply includes electrical contacts 54 on the sensor element 16 and electrical contacts 56 that are rigidly attached to the goods shelving unit 10. In this case, the contacts 56 are connected to a power supply (not shown in more detail here) by means of a cable 58.

Alternatively to electrical contacts 54, 56, coils can also be provided on the sensor element 16 and the goods shelving unit 10, said coils being coupled together inductively such that energy can be transmitted from the goods storage shelving unit to the sensor element.

The evaluation circuit 31 includes a transmitter (not shown in more detail here) by which a signal generated by the sensor elements 16 can be transmitted to a controller 52 over a data link 50 (shown here schematically). The data link can in particular be a wireless data link. The Bluetooth standard or another transmission standard can be used for the wireless communication.

In principle, it is conceivable for the signals of the evaluation circuit 31 to also be transmitted in a wired manner.

The controller 52 can suitably evaluate the signal of the sensor elements 16.

The controller 52 can also execute a calibration cycle, in which the signals of the sensor elements 16 are received once in an unloaded state (i.e. when the goods storage compartments 12 are empty) and then with the goods storage compartments 12 loaded in a certain manner. In particular, the tilt of the bottom 14 of the goods storage compartments 12 influences the signals of the sensor element since a greater tilt causes the weight of the top main plate 26 to have a lesser influence.

The controller can evaluate the signals sent by the evaluation circuit 31 in such a way as to determine whether there are still sufficient supplies in the relevant goods storage compartment 12. If this is not the case, the controller 52 can emit a signal via a signal output (or a plurality of signals either simultaneously or one after the other), which then have different consequences.

A signal can be emitted to a display device 60, on which it can be indicated that a particular goods storage compartment needs restocking.

A signal can also be transmitted by the controller 52 to an inventory management system (in this case denoted by a cloud solution 62), such as to trigger an ordering process.

It is also possible for the controller 52 to send a signal to a goods processing device, which in this case is denoted by an oven 64. As a result, the controller 52 can trigger the production of new goods, which are then stocked in the goods storage compartments 12.

The invention claimed is:

1. A goods stocking system comprising:
    a goods shelving unit comprising:
    at least one goods storage compartment carried by said goods shelving unit and configured to store goods for consumption on a bottom surface of said at least one goods storage compartment, with the bottom surface descending diagonally towards a removal side of said goods shelving unit such that the goods stored thereon slide forward after removal of at least one of the goods by a customer,
    a sensor element arranged on the bottom surface of said at least one goods storage compartment and configured to wirelessly transmit a signal corresponding to how many goods are on the bottom surface,
    an energy supply coupled to said sensor element;
    a controller configured to receive the signal transmitted by said sensor element to evaluate how many goods are on the bottom surface of said at least one goods storage compartment; and
    an oven coupled to said controller and configured to operate in response to the at least one goods storage compartment needing to be restocked.

2. The goods stocking system according to claim 1, wherein said sensor element comprises a pair of spaced apart electrodes configured to form a capacitive sensor.

3. The goods stocking system according to claim 2, wherein said sensor element further comprises an evaluation circuit configured to determine a capacitance of the capacitive sensor in response to the goods on the bottom surface of said at least one goods storage compartment.

4. The goods stocking system according to claim 2, wherein the capacitive sensor further comprises, between said pair of electrodes, spaced-apart first and second main bodies, and a resilient material between said first and second main bodies, with the resilient material being deformed such that a distance between said pair of electrodes is reduced in response to how many goods are on the bottom surface of said at least one goods storage compartment.

5. The goods stocking system according to claim 1, wherein said sensor element extends substantially over all of the bottom surface of said at least one goods storage compartment.

6. The goods stocking system according to claim 1, further comprising a display coupled to said controller to display a message indicating that the at least one goods storage compartment needs to be restocked.

7. The goods stocking system according to claim 1, wherein said energy supply comprises a battery.

8. The goods stocking system according to claim 1, wherein said sensor element comprises a first electrical contact and said at least one goods storage compartment comprises a second electrical contact, with said energy supply being coupled to the first and second electrodes.

9. The goods stocking system according to claim 1, wherein said energy supply comprises a first coil associated with said sensor element and a second coil assigned to said at least one goods storage compartment, with said first and second coils being inductively coupled together.

10. The goods stocking system according to claim 1, further comprising an inventory management system configured to receive an output signal from said controller, with the output signal being used to trigger an ordering process to restock the goods placed on the bottom surface of said at least one goods storage compartment.

11. A goods stocking system comprising:
a goods shelving unit comprising:
at least one goods storage compartment comprising a top and a bottom;
a sensor element, wherein the sensor element comprises a sheet and is removably arranged on the bottom of the at least one goods storage compartment;
an external power supply, wherein the external power supply is configured to power the sensor element;
a controller configured to evaluate a signal of the sensor element; and
a data link disposed between the sensor element and the controller,
wherein the goods stocking system is configured such that an electrical connection between the external power supply and the sensor element is automatically established when the sensor element is arranged on the bottom of the at least one goods storage compartment.

12. The goods stocking system of claim 11, wherein the sensor element comprises two electrodes, wherein the two electrodes comprise a capacitive sensor.

13. The goods stocking system of claim 12, wherein the sensor element comprises an evaluation circuit for evaluating the capacitance of the capacitive sensor.

14. The goods stocking system of claim 11 wherein the external power supply comprises electrical contacts disposed on the sensor element, wherein the electrical contacts are electrically connected to the at least one goods storage compartment.

15. The goods stocking system of claim 11 wherein the external power supply comprises a first coil operably engaged with the sensor element and a second coil operably engaged with the at least one goods storage compartment, wherein the first coil and the second coil are inductively coupled together.

16. The goods stocking system of claim 11, wherein the controller comprises a signal output for requesting goods be sent to the at least one goods storage compartment.

17. The goods stocking system of claim 16, wherein the signal output is connected to a display device.

18. The goods stocking system of claim 16, wherein the signal output is connected to an inventory management system.

19. The goods stocking system of claim 16, wherein the signal output is connected to a goods processing device.

20. The goods stocking system of claim 11 wherein the sensor element comprises a transmitter configured to wirelessly transmit data to the controller.

* * * * *